(12) United States Patent
Reatherford et al.

(10) Patent No.: US 7,748,590 B2
(45) Date of Patent: Jul. 6, 2010

(54) ULTRASONIC WELDING APPARATUS

(75) Inventors: Larry Reatherford, Clarkston, MI (US);
Elizabeth T. Hetrick, Ann Arbor, MI (US); Daniel E. Wilkosz, Saline, MI (US); Jan Skogsmo, Molndal (SE);
Joseph Walsh, Quarryville, PA (US)

(73) Assignees: Ford Global Technologies, LLC, Dearborn, MI (US); Jaguar Cars Limited, Whitley, Coventry (GB)

( * ) Notice: Subject to any disclaimer, the term of this patent is extended or adjusted under 35 U.S.C. 154(b) by 947 days.

(21) Appl. No.: 11/129,775

(22) Filed: May 16, 2005

(65) Prior Publication Data
US 2006/0255091 A1    Nov. 16, 2006

(51) Int. Cl.
*B23K 1/06* (2006.01)
*B23K 37/00* (2006.01)

(52) U.S. Cl. ............ 228/1.1; 228/110.1; 156/73.1

(58) Field of Classification Search .......... 228/1.1, 228/110.1; 156/73.1, 73.2
See application file for complete search history.

(56) References Cited

U.S. PATENT DOCUMENTS

| | | | | |
|---|---|---|---|---|
| 3,038,358 A | * | 6/1962 | Jones | 228/1.1 |
| 3,780,926 A | * | 12/1973 | Davis | 228/1.1 |
| 6,109,502 A | * | 8/2000 | Sato | 228/1.1 |
| 6,523,732 B1 | * | 2/2003 | Popoola et al. | 228/1.1 |
| 6,612,479 B2 | * | 9/2003 | Popoola et al. | 228/110.1 |
| 6,691,909 B2 | * | 2/2004 | Skogsmo et al. | 228/111.5 |

* cited by examiner

*Primary Examiner*—Kuang Y Lin
*Assistant Examiner*—Devang Patel
(74) *Attorney, Agent, or Firm*—Tung & Associates; Raymond L. Coppiellie

(57) ABSTRACT

An ultrasonic welding apparatus having an extractable sonotrode. The sonotrode having a non-threaded outer peripheral surface and a tapered mating surface that meets with a correspondingly tapered aperture formed in the end of the reed of the ultrasonic welding apparatus. In the preferred embodiment the ultrasonic welding apparatus includes a sonotrode removal mechanism for extracting the sonotrode from the reed.

5 Claims, 4 Drawing Sheets

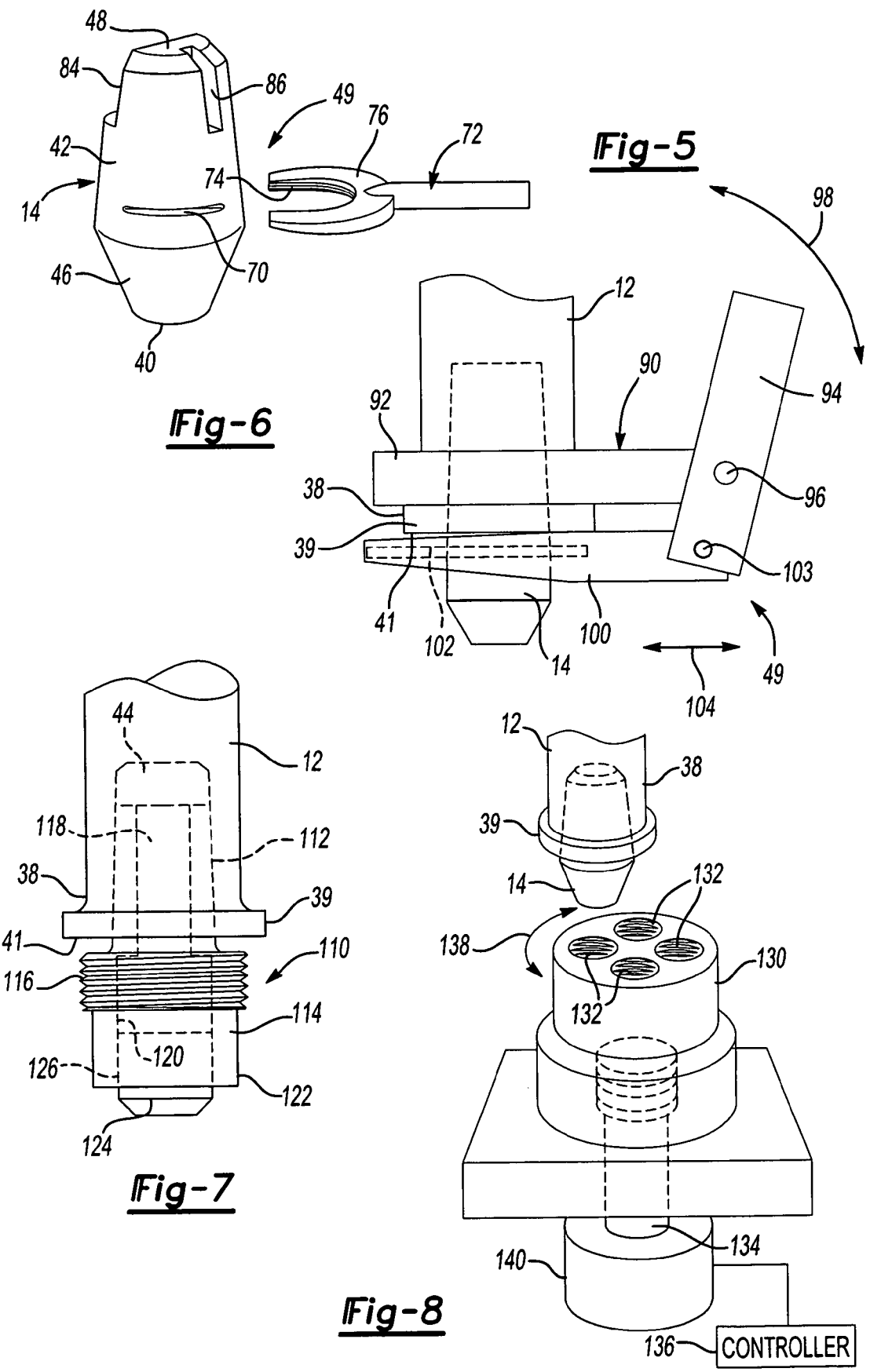

ULTRASONIC WELDING APPARATUS

FEDERAL SPONSORSHIP

The U.S. Government has a paid-up license in this invention and the right, in limited circumstances, to require the patent owner to license others on reasonable terms as provided for by the terms of Contract No. 70NANB3H3015 awarded by the National Institute of Standards and Technology.

CROSS-REFERENCE TO RELATED APPLICATIONS

Not Applicable

BACKGROUND OF THE INVENTION

1. Field of the Invention

The present invention relates generally to an ultrasonic welding apparatus; and, more specifically, to a replaceable sonotrode tip for use with an ultrasonic welding apparatus.

2. Description of Related Art

Ultrasonic welding of various materials is known. The process involves vibrating overlapping workpieces clamped between a sonotrode and an anvil. Frictional forces occurring between the vibrating workpieces create a bond or weld that occurs at the interface between the workpieces, effectively joining them to one another. Various sonotrode and anvil surface configurations; i.e., the surface that contacts the workpieces, are known and used to transfer energy from the sonotrode to the interface between the workpieces.

During the course of welding operations, the sonotrode will wear slowly. It is also possible that some of the weldment material may build up on the sonotrode, potentially clogging the gripping or contact surface of the sonotrode, and reduce the efficiency of the ultrasonic welding apparatus as energy normally transferred to the workpiece to perform the weld is lost. The more clogged or worn the gripping or contact surface of the sonotrode, the more its efficiency is reduced. Ultimately, it becomes necessary to clean or replace the sonotrode.

In some instances, it may be advantageous or necessary to change the sonotrode depending upon the material being joined. For example, welding different materials may require different sonotrodes or more specifically, different gripping patterns on the contact surface of the sonotrode.

Sonotrodes are typically manufactured by machining a block of raw stock, typically tool steel, into a predetermined shape. The machining process usually includes machining a taper on one end of the sonotrode such that it fits in a corresponding tapered aperture located in the end of a reed of the ultrasonic welding apparatus. A sonotrode typically includes a plurality of threads cut into the outer circumferential surface thereof. The threads operate in conjunction with a threaded fastener, such as a nut, to extract or remove the sonotrode from the reed. Specifically, rotating the threaded fastener on the threads of the sonotrode causes the threaded fastener to engage the lower surface of the reed and correspondingly extract the sonotrode by pulling the sonotrode from the reed.

As indicated above, currently sonotrodes are manufactured by starting with a block of raw stock, much of which is machined away to create the sonotrode. The raw stock, typically high-grade tool steel, is expensive. At the start, the block of raw stock must be of a size or diameter greater than the outer diameter of the threads cut or machined into the outer circumferential surface of the sonotrode, as the threaded portion or threads in the outer circumferential surface of the sonotrode are formed by removing material from the block of raw stock. In addition, additional material must be machined away to taper one end of the sonotrode, such that it mates with a corresponding taper in the reed of the ultrasonic welding apparatus.

Besides being costly from a material standpoint, i.e., much of the raw stock is removed and discarded during the machining process; the machining process is labor intensive, which also increases sonotrode costs. Finally, the pattern on the gripping or contact surface of the sonotrode often requires placement in a precise position or orientation with respect to the direction of reed vibration.

A clogged or worn sonotrode must be cleaned or replaced. In either case, the sonotrode is removed from the reed. Thus, there is a need in the art for an ultrasonic welding tool whereby a clogged or worn sonotrode can easily be removed from the reed and replaced with a clean sonotrode in a quick and efficient manner to reduce downtime and correspondingly maintain continued operation of the ultrasonic welding equipment. Further, since it may not be feasible to clean the contact surface of the sonotrode, there is a need for a sonotrode that requires less machining or fabrication time to produce a finished sonotrode which correspondingly reduces the overall cost or expense of the sonotrode.

SUMMARY OF THE INVENTION

Accordingly, the present invention is an ultrasonic welding apparatus having a replaceable sonotrode. In one embodiment, the sonotrode has a non-threaded outer peripheral surface, a gripping or contact surface and a tapered surface on one end thereof that mates with a correspondingly tapered aperture formed in the end of a reed of an ultrasonic welding apparatus. In one embodiment of the present invention, the reed further includes a passageway extending there through. A rod, sized to fit within the passageway, extends through the reed and applies a force to the sonotrode to extract the sonotrode from the tapered end of the reed.

In a further embodiment of the present invention, the sonotrode includes a slot or a groove located on the non-threaded outer peripheral surface. A tool engages the slot or groove and is used to extract the sonotrode from the reed. In some instances, the tool may engage the reed during the removal process.

In accordance with a further embodiment of the present invention, the sonotrode may include an orientation or detent mechanism to properly align or orient the gripping or contact surface of the sonotrode with respect to the reed.

A further embodiment of the present invention includes a reusable sonotrode holder. The sonotrode holder has an internal taper for receiving a sonotrode and an external taper corresponding to the taper in the end of the reed. The sonotrode is inserted into the sonotrode holder with the sonotrode holder being inserted into the end of the reed. The sonotrode holder may include a plurality of external threads used to extract the sonotrode holder from the reed of the ultrasonic welding apparatus.

Accordingly, the ultrasonic welding apparatus includes a sonotrode having reduced manufacturing costs that is efficiently installed and extracted from the reed of the ultrasonic welding apparatus.

BRIEF DESCRIPTION OF THE DRAWINGS

FIG. 5 is a perspective view of the extractable sonotrode and extractor of FIG. 4.

FIG. 6 is a view of an alternative embodiment of an extractor and extractable sonotrode according to the present invention.

FIG. 7 is a view of an alternative embodiment of the present invention illustrating a sonotrode holder for use with an ultrasonic welding apparatus.

FIG. 8 is a perspective view of a rotatable anvil having a plurality of contact surfaces for use with an ultrasonic welding apparatus.

DETAILED DESCRIPTION OF THE PREFERRED EMBODIMENTS

Figure 1:
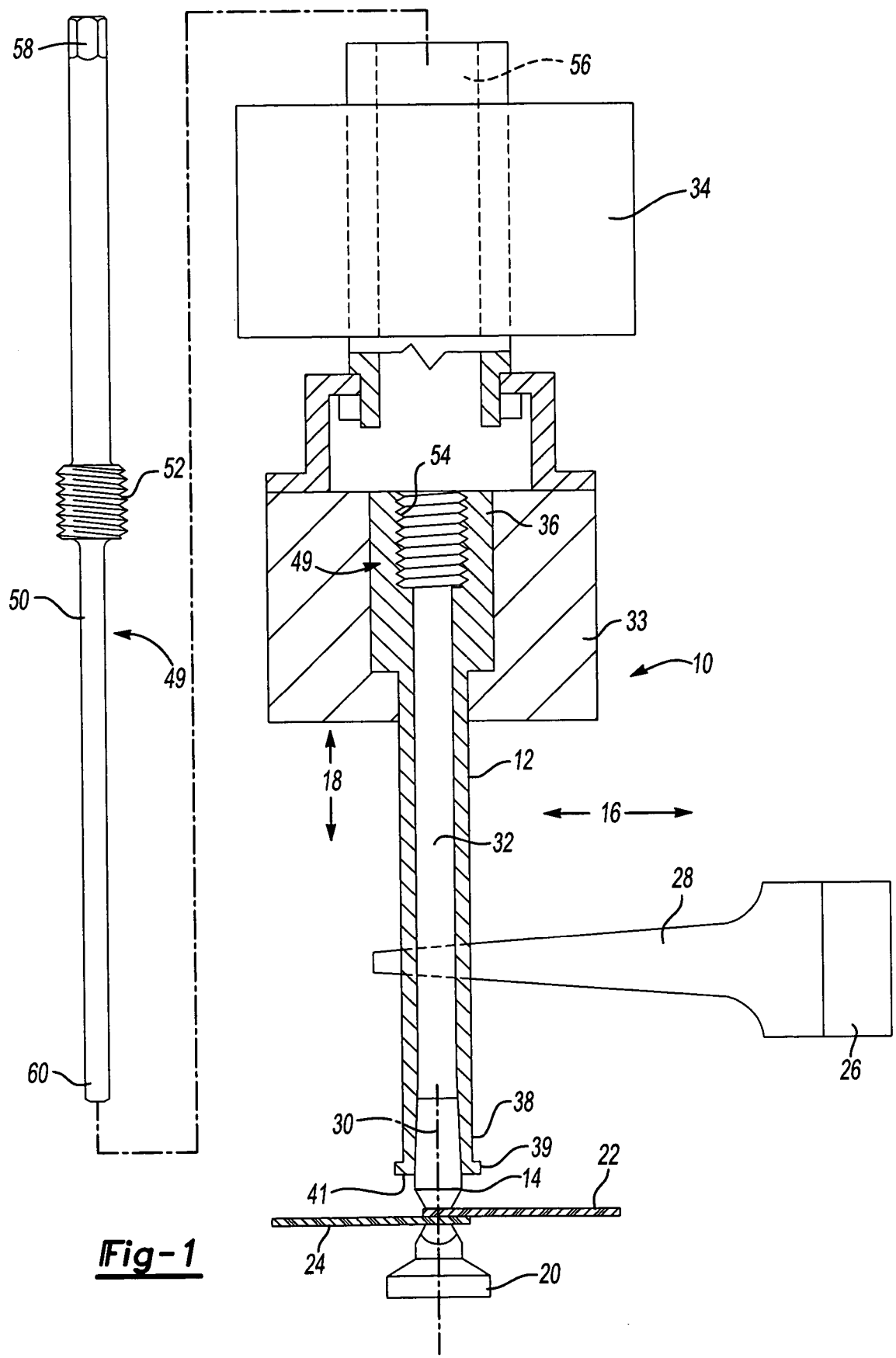
FIG. 1 is a schematic view of an ultrasonic welding apparatus according to one embodiment of the present invention.

FIG. 1 shows an ultrasonic welding apparatus, seen generally at 10, according to one embodiment of the present invention. The ultrasonic welding apparatus 10 includes a reed 12 having a sonotrode 14 mounted at one end thereof. The reed 12 is mounted for movement in a side to side or horizontal direction of vibration, shown by the arrow 16. The reed 12 also moves in a vertical manner, shown by the arrow 18, and in cooperation with an anvil 20 clamps first 22 and second 24 workpieces in position. Once the workpieces 22, 24 are clamped, a transducer 26, connected to the reed 12 by a wedge 28, vibrates the reed 12 at a high frequency (typically 15 to 40 kHz) to impart energy through the sonotrode 14 to the first 22 and second 24 workpieces at a location between the sonotrode 14 and the anvil 20 to create a bond or weld at the interface or adjacent surfaces 30 of the workpieces 22, 24. As used herein, the term sonotrode generally refers to a tool attached to the reed of an ultrasonic welding apparatus and it may also be referred to as the sonotrode tip. Accordingly, the sonotrode or sonotrode tip refers to a gripping tool attached to the end of the reed.

Figure 2:
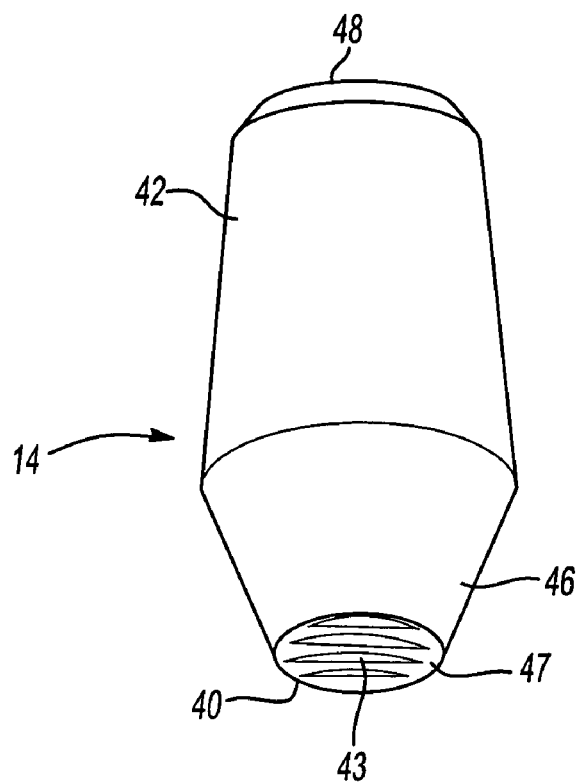
FIG. 2 is a perspective view of a sonotrode for use with an ultrasonic welding apparatus.

As shown in FIG. 2, the sonotrode 14 is a generally cylindrical member having a contact surface 40 and a shank portion including a mounting surface 42. The mounting surface 42 tapers inwardly and is complementary to an internal taper 44 located in the bottom end 38 of the reed 12. The contact surface 40 includes a plurality of grooves and/or ridges 43 designed to engage the workpiece and transfer ultrasonic energy to the workpieces 22, 24 to perform the welding operation. The sonotrode 14 further includes a transitional portion 46 extending from the mounting surface 42 to the contact surface 40. The transitional portion 46 is shown in the preferred embodiment as a beveled surface extending from the mounting surface 42 to the contact surface 40. The transitional portion 46 may also have other configurations or shapes such as cylindrical, arcuate or formed with angular features.

The sonotrode 14 has an overall length extending between a distal or lower end 47 and a proximal or upper end 48. The lower end 47 being the end on which the contact surface 40 is formed and the upper end 48 being that end of the sonotrode 14 that is inserted into the reed 12. The sonotrode 14 is secured in the reed 12 in a press fit manner such that the mounting surface 42 engages the internal taper 44 located in the bottom end 38 of the reed 12. Typically, a majority of the mounting surface 42 is inserted into the reed 12 to adequately secure the sonotrode 14 in the reed 12.

Figure 3:
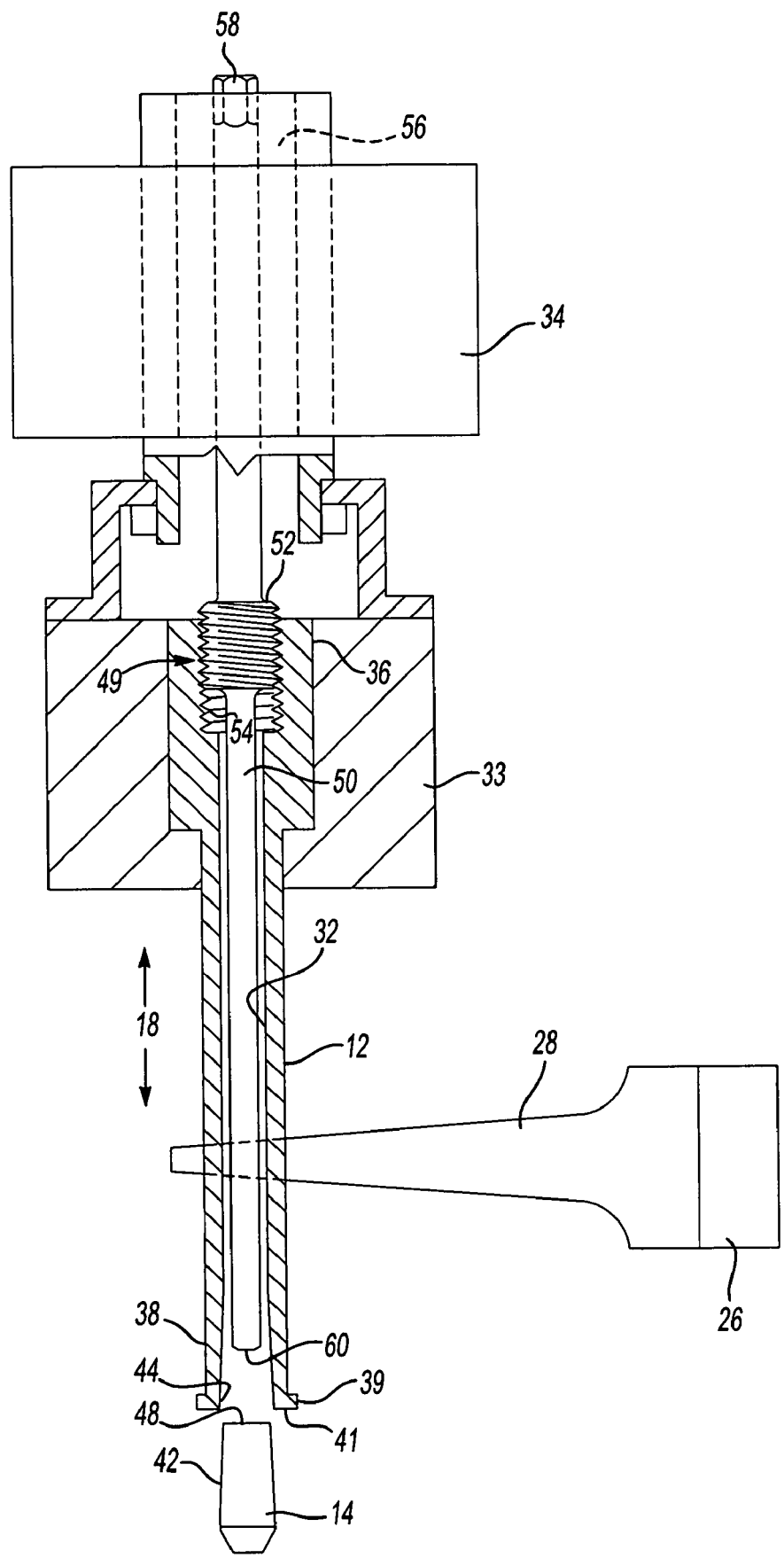
FIG. 3 is a schematic view of the ultrasonic welding apparatus according to FIG. 1 illustrating extraction of the sonotrode.

Reducing the length of the sonotrode 14 that extends past the bottom surface 41 of the lower end 38 of the reed 12 makes extraction of the sonotrode 14 from the reed 12 using conventional methods more difficult, if not impossible. Accordingly, FIGS. 1 & 3 illustrate a preferred embodiment of a sonotrode removal mechanism, seen generally at 49, used to extract the sonotrode 14 from the reed 12. The sonotrode removal mechanism 49 includes an extraction rod 50 having a threaded portion 52. The extraction rod 50 is sized for insertion into the passageway 32 of the reed 12. The upper end 36 of the reed 12 is supported for vibratory movement in a support structure 33. The reed 12 includes an internal threaded portion 54 that is complementary to the threaded portion 52 of the extraction rod 50. The frame 34 of the ultrasonic welding apparatus 10 also includes a passageway 56 allowing access to the passageway 32 located in the reed 12. The extraction rod 50 further includes a drive end 58 configured to receive a driving tool (not shown) used to rotate the extraction rod 50 and an extraction end 60 that engages the sonotrode 14. As shown in FIG. 3, when the extraction rod 50 is rotated, the complementary threaded portions 52, 54 cooperate to move the extraction rod 50 downward such that the extraction end 60 of the extraction rod 50 engages the upper end 48 of the sonotrode 14, whereby continued downward movement of the extraction rod 50 drives the sonotrode 14 out from the lower end 38 of the reed 12.

While shown herein as removable from the reed 12, the sonotrode removal mechanism 49 may remain within the reed 12 during ultrasonic welding operations. Further, other sonotrode removal mechanisms can also be used to drive the extraction rod 50 downward such that the extraction end 60 of the extraction rod 50 engages the upper surface 48 of the sonotrode 14 and extracts the sonotrode 14 from the reed 12. Examples of such sonotrode removal mechanisms include hydraulic or pneumatic cylinders for driving the extraction rod 50 or for simply acting directly on the sonotrode 14. The primary purpose of the sonotrode removal mechanism 49 is to extract the sonotrode 14 from the lower end 38 of the reed 12 by separating the correspondingly tapered components thus disengaging the press fit. Once the press fit is disengaged, the sonotrode 14 is easily extracted from the reed 12 as the mounting surface 42 of the sonotrode 14 no longer engages the internal taper 44 of the reed 12.

Figure 4:
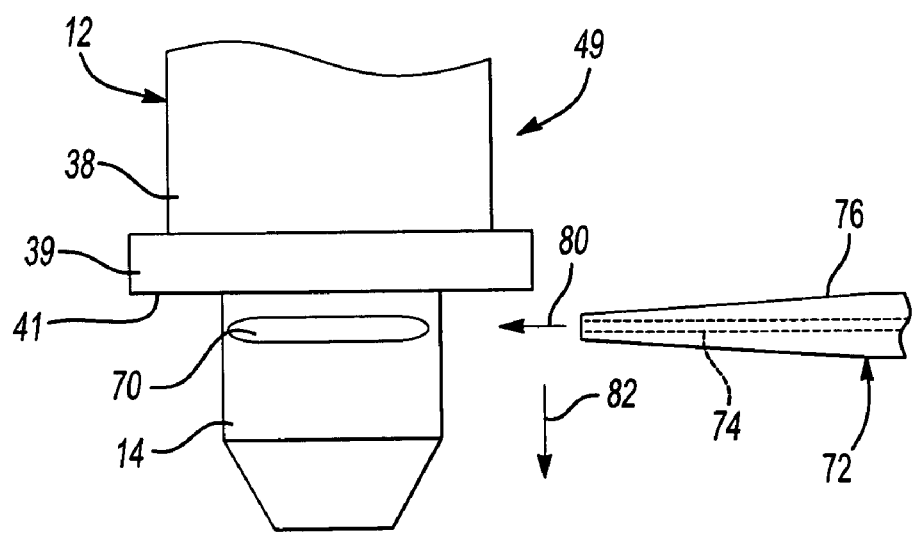
FIG. 4 is a partial view of an alternative embodiment according to the present invention of an extractable sonotrode and an extractor for removing the sonotrode.

Turning now to FIGS. 4-5, there is shown an alternative embodiment of a sonotrode removal mechanism 49 for extracting a sonotrode 14 from the lower end 38 of the reed 12. As shown, the sonotrode 14 includes one or more grooves 70 located in the outer peripheral surface of the sonotrode 14. In the preferred embodiment, the grooves 70 are located in the mounting surface 42 of the sonotrode 14. The grooves 70 are positioned just above the transition portion 46 such that when the sonotrode 14 is mounted in the reed 12, the grooves 70 are located just below the lower edge or surface 41 of the flange 39 located on the lower end 38 of the reed 12. A sonotrode removal tool 72 including a U-shaped wedge member 76 having a pair of fingers 74 sized to fit in the grooves 70 is used to remove or extract the sonotrode 14 from the reed 12. In operation, the sonotrode removal tool 72 is inserted or placed on the sonotrode 14 such that the fingers 74 fit in the grooves 70 and the wedge shaped portion 76 engages the bottom surface 41 of the flange 39 located at the lower end 38 of the reed 12. As the sonotrode removal tool 72 is urged in the direction shown by arrow 80, the wedge shaped portion 76 acts against the bottom surface 41 of the flange 39 to drive the sonotrode 14 downward in the direction shown by the arrow 82. As with the previous embodiment, once the press fit relationship between the sonotrode 14 and the reed 12 is disengaged, the sonotrode 14 is easily extracted from the reed 12 as the mounting surface 42 of the sonotrode 14 no longer engages the internal taper 44 of the reed 12.

FIG. 5 further discloses the sonotrode 14 having a detent or orientation mechanism. Specifically, a portion of the upper end 48 of the sonotrode 14 may be removed leaving one side of the sonotrode 14 with a flat surface 84. As an alternative, a slot 86 may also be cut in the upper end 48 of the sonotrode 14. In either case, a complementary projection or tab is formed in the lower end 38 of the reed 12 whereby when the sonotrode 14 is inserted into the lower end 38 of the reed 12, it is properly oriented within the reed 12.

FIG. 6 illustrates a further embodiment of a sonotrode removal mechanism 49 including an extraction tool 90 including a U-shaped support arm 92 that extends around the reed 12 and sits on the flange 39 located at the lower end 38 of the reed 12. A lever arm 94 is pivotally connected, by a pivot pin 96, to the support arm 92 for movement in the direction shown by the arrow 98. A U-shaped wedge member 100, having a pair of inwardly extending fingers 102, is pivotally connected by a pivot pin 103 to the lever arm 94. Accordingly, rotation of the lever arm 94, in the direction shown by the arrow 98, causes the wedge member 100 to move back and forth in the direction shown by the arrow 104. As with the previous embodiment, the inwardly extending fingers 102 of the wedge member 100 engage the grooves 70 located in the sonotrode 14. As shown in FIG. 6, as the wedge member 100 is driven to the left, the wedge member 100 is supported on and acts against the bottom surface 41 of the flange 39 such that the fingers 102 apply a downward force on the sonotrode 14 to extract the sonotrode 14 from the reed 12. Once again, when the press fit between the sonotrode 14 and the reed 12 is disengaged, the sonotrode 14 is easily extracted from the reed 12 as the mounting surface 42 of the sonotrode 14 no longer engages the internal taper 44 of the reed 12.

FIG. 7 illustrates a further embodiment of the present invention including a sonotrode holder, seen generally at 110. The sonotrode holder 110 includes a tapered mounting surface 112 sized to fit within the internal taper 44 located in the end 38 of the reed 12. The sonotrode holder 110 includes a cylindrical portion 114 having a plurality of threads 116 located on the outer circumferential surface of the cylindrical portion 114. A passageway 118 extends through the sonotrode holder 110. The passageway 118 has an internal taper 120 located at the lower or sonotrode end 122 of the sonotrode holder 110. Accordingly, a sonotrode 124 having a tapered mounting surface 126 is inserted and mounted in a press-fit manner within the cylindrical section 114 of the sonotrode holder 110.

The sonotrode holder 110 mounts in a press fit manner within the reed 12. A threaded member (not shown), such as a nut, having internal threads complementary to the threads 116 on the cylindrical portion 114 is used to extract the sonotrode holder 110 from the reed 12 in a conventional manner. Once the sonotrode holder 110 is extracted, a punch or other suitable tool can be inserted through the passageway 118 and used to drive the sonotrode 124 from the sonotrode holder 110. It should be understood that the sonotrode removal mechanisms 49, previously disclosed for extracting the sonotrode 14, may also be used to extract the sonotrode holder 110 from the reed 12.

FIG. 8 illustrates an indexable anvil 130 having a plurality of contact surfaces 132. During continued welding operations, wear or build up of material on the contact or gripping surfaces of an anvil may occur. When this happens, the workpieces can potentially slip or stick to the anvil Accordingly, the indexable anvil 130 of the present invention is mounted to a rotatable shaft 134, which upon receiving a signal from a controller 136 operates to index or rotate the indexable anvil 130 in the direction shown by the arrow 138. Thus, when a contact surface 132 becomes worn or clogged, the controller 136 actuates a drive mechanism 140 which rotates the shaft 134 to position a new contact surface below the sonotrode 14. Further, the indexable anvil 130 may have a plurality of contact surfaces 132 each having a different orientation or configuration whereby they can easily be changed to accommodate ultrasonic welding of different materials.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An ultrasonic welding apparatus comprising:
a sonotrode, said sonotrode having a non-threaded peripheral outer surface, said non-threaded peripheral outer surface including a contact surface and a mounting surface, said mounting surface having an external taper;
a reed, said reed having an internal socket for receiving said sonotrode and a bottom surface, said socket including an internal taper whereby said sonotrode is press-fit into said socket on said reed such that a portion of said sonotrode extends outward from said internal socket past said bottom surface wherein said portion of said sonotrode extending past said bottom surface is non-threaded;
said reed including a longitudinal passageway extending through said reed from an upper end of said reed to a lower end of the reed;
a sonotrode removal mechanism; and
said sonotrode removal mechanism includes an extraction rod located in said passageway for reciprocal, longitudinal movement in said passageway independent of said sonotrode, said extraction rod having a drive end and an extraction end, said extraction end operative to engage an upper end of said sonotrode whereby longitudinal movement of the extraction rod drives said sonotrode out of said socket.

2. An ultrasonic welding apparatus as set forth in claim 1 wherein said reed includes said passageway having a plurality of internal threads located at said upper end thereof; and said extraction rod includes a plurality of external threads located thereon, said external threads on said extraction rod are complementary to said internal threads in said passageway of said reed whereby threadably engaging the external threads of said extraction rod with the internal threads of said passageway of said reed and rotating the extraction rod causes the extraction rod to move longitudinally and drive said sonotrode out of said socket.

3. An ultrasonic welding apparatus as set forth in claim 2 wherein said drive end is configured to receive a tool used to rotate said extraction rod.

4. An ultrasonic welding apparatus as set forth in claim 1 including a fluid cylinder connected to and driving said extraction rod in said longitudinal direction.

5. An ultrasonic welding apparatus comprising:
a sonotrode, said sonotrode including a non-threaded body, said body having a distal end and a proximal end;
a contact surface located at said distal end;

a tapered mounting surface extending from said proximal end toward said distal end;

an inwardly beveled portion extending from said mounting surface to said contact surface;

a reed, said reed including a passageway extending through said reed from an upper end of said reed to a lower end of the reed, said reed including an internal taper, said internal taper located at the bottom end of said reed, said sonotrode inserted in said reed wherein said mounting surface of said sonotrode engages said internal taper of said reed such that a majority of the mounting surface is disposed within said reed wherein said sonotrode is press fit into said reed;

said reed including a passageway extending through said reed from an upper end of said reed to a lower end of the reed, wherein said internal taper of said reed is located at the bottom end of said reed; and an extraction rod sized to fit in and move longitudinally within said passageway independent of said sonotrode, said extraction rod having a drive end and an extraction end, said extraction end operative to engage an upper end of said sonotrode whereby movement of the extraction rod in the longitudinal direction of said passageway drives said sonotrode from the lower end of the reed.

* * * * *